US012546299B2

(12) United States Patent
Tsukada et al.

(10) Patent No.: US 12,546,299 B2
(45) Date of Patent: Feb. 10, 2026

(54) LIQUID DELIVERY PUMP (71) Applicant: Hitachi High-Tech Corporation, Tokyo (JP)

(72) Inventors: Nobuhiro Tsukada, Tokyo (JP); Daisuke Kanai, Tokyo (JP); Sho Iwasa, Tokyo (JP); Yushi Harada, Tokyo (JP); Yusuke Yota, Tokyo (JP)

(73) Assignee: HITACHI HIGH-TECH CORPORATION, Tokyo (JP)

(*) Notice: Subject to any disclaimer, the term of this patent is extended or adjusted under 35 U.S.C. 154(b) by 0 days.

(21) Appl. No.: 18/715,904

(22) PCT Filed: Nov. 14, 2022

(86) PCT No.: PCT/JP2022/042160
§ 371 (c)(1),
(2) Date: Jun. 3, 2024

(87) PCT Pub. No.: WO2023/127327
PCT Pub. Date: Jul. 6, 2023

(65) Prior Publication Data
US 2025/0035096 A1 Jan. 30, 2025

(30) Foreign Application Priority Data
Dec. 28, 2021 (JP) ................................. 2021-214281

(51) Int. Cl.
F04B 23/06 (2006.01)
F04B 51/00 (2006.01)
(52) U.S. Cl.
CPC .............. F04B 23/06 (2013.01); F04B 51/00 (2013.01)
(58) Field of Classification Search
CPC ...... F04B 11/0058; F04B 13/00; F04B 23/06; F04B 49/065
See application file for complete search history.

(56) References Cited

U.S. PATENT DOCUMENTS

2020/0278329 A1* 9/2020 Yanagibayashi .... F04B 11/0058
2021/0231621 A1 7/2021 Ogawa
(Continued)

FOREIGN PATENT DOCUMENTS

EP 2244091 B1 9/2015
JP 2009-013957 A 1/2009
(Continued)

OTHER PUBLICATIONS

International Search Report of PCT/JP2022/042160 dated Dec. 13, 2022.
(Continued)

Primary Examiner — Kenneth J Hansen
(74) Attorney, Agent, or Firm — MATTINGLY & MALUR, PC (57) ABSTRACT A liquid delivery pump delivers a liquid with high flow rate accuracy in consideration of solvent expansion, pressure dependent leakage of the solvent, and flow rate dependent leakage of the solvent. A liquid delivery pump includes first and second plunger pumps connected together, having respective first and second plungers. A pressure sensor measures a liquid delivery pressure (P2) from the second plunger pump, and a controller controls the driving of the first and second plungers. The controller obtains a moving speed (v1) of the first plunger and a moving speed (v2) of the second plunger using a parameter (C1, C0) depending on the liquid delivery pressures (P1, P2), the liquid delivery pressure, and a target flow rate of the liquid. The parameter (C1, C0) is a parameter of an expression representing a relationship between the liquid delivery pressure (P2) and a flow rate (Q0) of the liquid.

4 Claims, 5 Drawing Sheets (56) References Cited

U.S. PATENT DOCUMENTS

2022/0244222 A1 8/2022 Yanagibayashi
2023/0091683 A1 3/2023 Akieda et al.

FOREIGN PATENT DOCUMENTS

| WO | 2019/082243 A1 | 5/2019 |
| WO | 2019/220563 A1 | 11/2019 |
| WO | 2021/005728 A1 | 1/2021 |
| WO | 2021/192929 A1 | 9/2021 |

OTHER PUBLICATIONS

International Preliminary Report on Patentability dated Feb. 28, 2023.

* cited by examiner

LIQUID DELIVERY PUMP

TECHNICAL FIELD

The present invention relates to a pump for delivery of a liquid.

BACKGROUND ART

A liquid delivery pump is a pump for delivery of a liquid of a fixed amount, and is used for a liquid chromatograph, for example. In the analysis using the liquid chromatograph, an analysis result needs to be highly reproducible, and for this purpose, high flow rate accuracy is required for the liquid delivery pump.

In general, a liquid chromatograph includes a liquid delivery pump that delivers a solvent that is a liquid, an injector for introducing a sample into the liquid chromatograph, a separation column, a detector, a waste liquid container, and a system control unit that controls these devices. The liquid delivery pump used for the liquid chromatograph is generally configured by two plunger pumps that are connected in series. A plunger pump on the upstream side (first plunger pump) suctions, compresses, and discharges a solvent. Since it is not possible to deliver a liquid at a constant flow rate only by the first plunger pump, another plunger pump (second plunger pump) is connected to the downstream side of the first plunger pump. The second plunger pump performs an operation of canceling a pulsating flow of the first plunger pump (that is, discharging the solvent when the first plunger pump suctions and compresses the solvent). The liquid delivery pump can deliver a solvent at a constant flow rate by such operations of the first plunger pump and the second plunger pump.

The injector injects a sample to be analyzed into the solvent discharged from the liquid delivery pump. The solvent into which a sample is injected is introduced into the separation column and separated into components, and then characteristics corresponding to the sample components, e.g. absorbance, fluorescence intensity, refractive index, and the like, are detected by the detector. The separation column is filled with microparticles. Due to a fluid resistance when the solvent flows through gaps among the microparticles, a load pressure of several tens to more than one hundred megapascals is generated in the liquid delivery pump. A magnitude of the load pressure varies depending on a diameter of the separation column (for example, about several millimeters), a size of the microparticles (for example, about several micrometers), and a passing flow rate.

The solvent is compressed to the load pressure and discharged from the liquid delivery pump. At the detector on the downstream side of the separation column, the pressure of the solvent is approximately at atmospheric pressure. Therefore, the solvent expands in the detector with respect to the state in the liquid delivery pump. In addition, in the liquid delivery pump, a minute amount of solvent may leak from a seal portion or a connection portion of the components. Therefore, in order to obtain high flow rate accuracy with the liquid delivery pump, it is necessary to control the liquid delivery pump in consideration of solvent leakage and expansion. The solvent leakage includes pressure dependent leakage and flow rate dependent leakage.

Examples of the conventional liquid delivery pump in consideration of solvent leakage or expansion are disclosed in PTLs 1 and 2, for example.

PTL 1 discloses a technique for correcting an influence of compression of a solvent. The liquid delivery device described in PTL 1 includes a discharge speed calculation unit that obtains a discharge speed of the plunger pump at which a converted value of a flow rate of the mobile phase (fluid) discharged from the pump unit to the discharge flow path under the atmospheric pressure becomes a set flow rate, and a discharge operation control unit that operates the plunger pump during the discharge stroke at the discharge speed obtained by the discharge speed calculation unit. Therefore, it is possible to accurately control the drive speed of the plunger so that the volume flow rate of the mobile phase under the atmospheric pressure becomes the set flow rate, and to reduce a deviation in the liquid delivery flow rate due to compressibility of the mobile phase.

PTL 2 discloses a technique for detecting a leakage and further correcting the leakage. In the device described in PTL 2, the pump is driven so that the flow rate becomes 0 at a predetermined constant pressure, and the displacement of the plunger at this time is analyzed to detect leakage, and the pump flow rate is adjusted to correct the detected leakage.

CITATION LIST

Patent Literatures

PTL 1: WO 2019/082243 A
PTL 2: EP 2244091

SUMMARY OF INVENTION

Technical Problem

In the technique disclosed in PTL 1, the liquid delivery pump is controlled in consideration only of the solvent expansion, and the solvent leakage is not considered. Therefore, it is difficult to achieve the required flow rate accuracy when the magnitude of leakage cannot be ignored with respect to the flow rate accuracy required for the liquid delivery pump.

In the technique disclosed in PTL 2, the pump flow rate is adjusted in consideration of the solvent leakage, but only pressure dependent leakage of the solvent is considered, and flow rate dependent leakage is not considered. Therefore, it is difficult to achieve the required flow rate accuracy in a case where a change in leakage when the flow rate changes cannot be ignored with respect to the flow rate accuracy required for the liquid delivery pump.

As described above, the conventional technique does not consider the solvent expansion, the pressure dependent leakage of the solvent, and the flow rate dependent leakage of the solvent, and thus a liquid delivery pump capable of delivering a liquid with high flow rate accuracy in consideration of these is desired.

An object of the present invention is to provide a liquid delivery pump capable of delivering a liquid with high flow rate accuracy in consideration of solvent expansion, pressure dependent leakage of the solvent, and flow rate dependent leakage of the solvent.

Solution to Problem

A liquid delivery pump according to the present invention is a liquid delivery pump that discharges a liquid, the liquid delivery pump including: a first plunger pump having a movable first plunger; a second plunger pump having a movable second plunger and connected to the first plunger pump; a pressure sensor disposed on a downstream side of the second plunger pump, and configured to measure a liquid delivery pressure that is a pressure of the liquid discharged from the second plunger pump; and a control unit configured to receive the liquid delivery pressure measured by the pressure sensor, and control driving of the first plunger and driving of the second plunger. The control unit obtains a moving speed of the first plunger and a moving speed of the second plunger using a parameter depending on the liquid delivery pressure, the liquid delivery pressure, and a target flow rate which is a predetermined flow rate of the liquid. The parameter is a parameter of an expression representing a relationship between the liquid delivery pressure and a flow rate of the liquid.

Advantageous Effects of Invention

According to the present invention, it is possible to provide a liquid delivery pump capable of delivering a liquid with high flow rate accuracy in consideration of solvent expansion, pressure dependent leakage of the solvent, and flow rate dependent leakage of the solvent.

DESCRIPTION OF EMBODIMENTS

A liquid delivery pump according to the present invention is a pump that discharges and delivers a solvent that is a liquid, and can be applied to a liquid chromatograph, for example. The liquid delivery pump according to the present invention is able to determine a pump operation (more specifically, a moving speed of a plunger) in consideration of solvent expansion, pressure dependent leakage of the solvent, and flow rate dependent leakage of the solvent, and to deliver a liquid with high flow rate accuracy. In the liquid delivery pump according to the present invention, a pump control unit obtains a value of a parameter of an expression representing a relationship between a liquid delivery pressure and the flow rate of the solvent in the detector, and drives the plunger at a speed obtained using the parameter. Furthermore, the liquid delivery pump according to the present invention can also feedback a pressure during liquid delivery to adjust the parameter during liquid delivery.

Hereinafter, the liquid delivery pump according to an embodiment of the present invention will be described. The flow rate described below refers to a volume flow rate unless otherwise specified.

Embodiment 1

<Configuration Example of Liquid Delivery Pump and Liquid Chromatograph>

Figure 1:
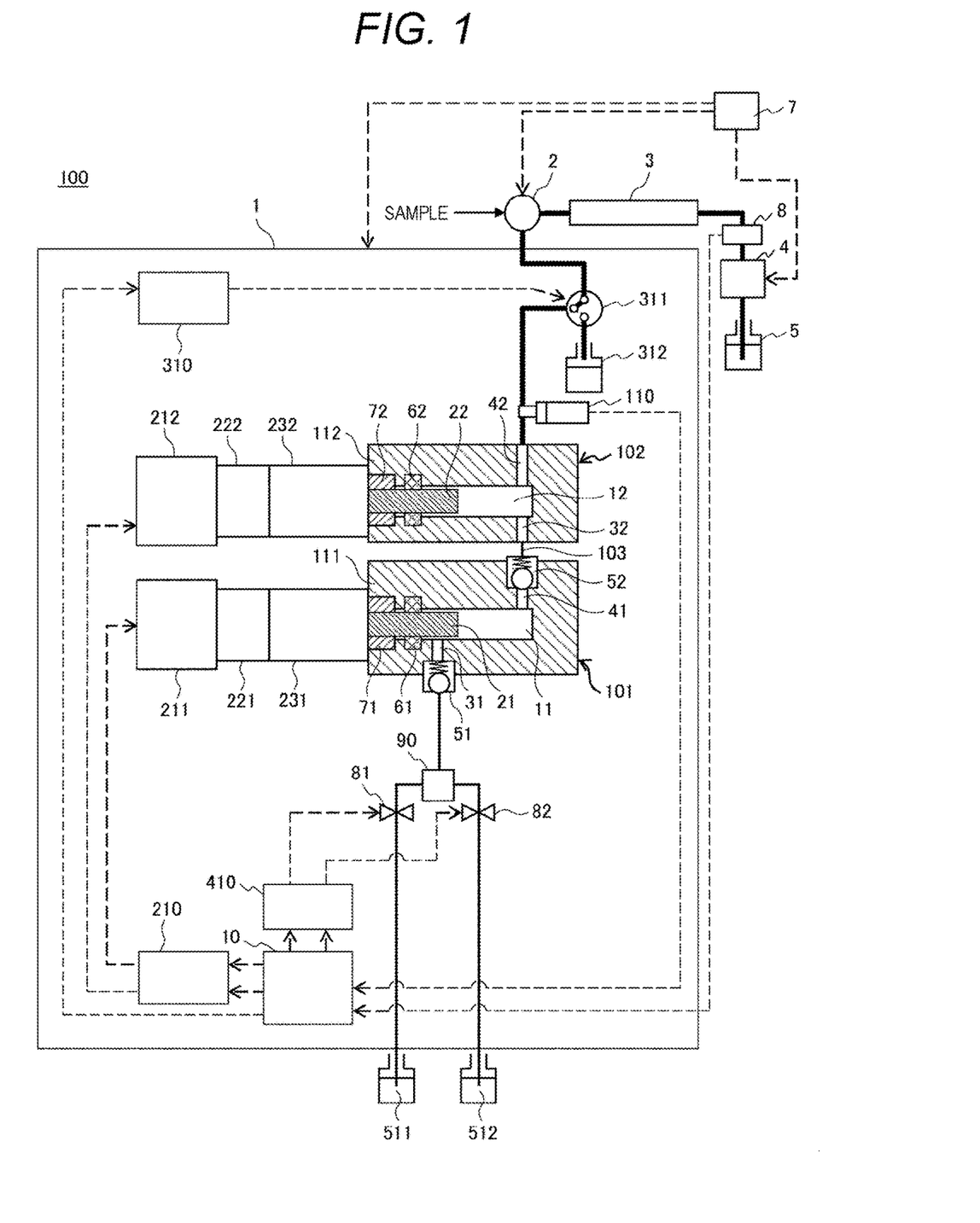
FIG. 1 is a schematic view showing a configuration of a liquid chromatograph including a liquid delivery pump according to Embodiment 1 of the present invention.

FIG. 1 is a schematic view showing a configuration of a liquid chromatograph 100 including a liquid delivery pump 1 according to Embodiment 1 of the present invention. The liquid chromatograph 100 includes the liquid delivery pump 1, an injector 2 for introducing a sample into the liquid chromatograph 100, a separation column 3, a detector 4, a waste liquid container 5, and a system control unit 7 that controls these devices.

As the injector 2, the separation column 3, the detector 4, and the waste liquid container 5, those generally used for a liquid chromatograph can be used, and thus, description of detailed configurations of these devices shall be omitted in the present embodiment.

The liquid delivery pump 1 includes a controller 10 which is a pump control unit, a pressure sensor 110, a first plunger pump 101, a second plunger pump 102, a connection flow path 103, a first electromagnetic valve 81, a second electromagnetic valve 82, a motor driver 210, a purge valve driver 310, a purge valve 311, a waste liquid tank 312, and an electromagnetic valve driver 410. The liquid delivery pump 1 discharges a liquid (for example, a solvent). On the downstream side of the liquid delivery pump 1, the injector 2, the separation column 3, the detector 4, and the waste liquid container 5 can be connected. In the present embodiment, the injector 2, the separation column 3, the detector 4, and the waste liquid container 5 are connected on the downstream of the liquid delivery pump 1. The detector 4 detects characteristics of the sample contained in the liquid (solvent) discharged from the liquid delivery pump 1.

The first plunger pump 101 and the second plunger pump 102 are connected in series with each other. The first plunger pump 101 is disposed on the upstream side, and the second plunger pump 102 is disposed on the downstream side. Here, the first plunger pump 101 and the second plunger pump 102 may be connected in parallel to each other. The present embodiment describes an example in which the first plunger pump 101 and the second plunger pump 102 are connected in series.

The pressure sensor 110 is disposed on the downstream side of the second plunger pump 102. The pressure sensor 110 measures a pressure (discharge pressure) of the solvent (liquid) discharged from the second plunger pump 102, and outputs the measured pressure value to the controller 10.

Although details will be described later, the controller 10 gives command values to the motor driver 210 and the electromagnetic valve driver 410 to operate these drivers based on the discharge pressure measured by the pressure sensor 110 and a predetermined operation sequence. In addition, the controller 10 gives a command value to the purge valve driver 310 to operate the purge valve driver 310 based on a predetermined operation sequence.

The first plunger pump 101 includes a first pump head 111 having a first pressurizing chamber 11, a first plunger 21, a first suction passage 31, a first discharge passage 41, a first check valve 51, a second check valve 52, a first seal 61, and a bearing 71. The first check valve 51 is disposed on a flow path of the first suction passage 31. The second check valve 52 is disposed on a flow path of the first discharge passage 41. The first check valve 51 and the second check valve 52 restrict a direction of the flow direction of the solvent. The first plunger 21 is a pressure member, and is slidably held by the bearing 71 in the first plunger pump 101. The first seal 61 prevents leakage of the liquid from the first pressurizing chamber 11.

The second plunger pump 102 includes a second pump head 112 including a second pressurizing chamber 12, a second plunger 22, a second suction passage 32, a second discharge passage 42, a second seal 62, and a bearing 72. The second check valve 52 and the second suction passage 32 are connected to each other by the connection flow path 103. That is, the first plunger pump 101 and the second plunger pump 102 are connected in series, and the first plunger pump 101 is disposed on the upstream side. The second plunger 22 is a pressure member, and is slidably held by the bearing 72 in the second plunger pump 102. The second seal 62 prevents leakage of the liquid from the second pressurizing chamber 12.

In the present specification, "rising" of the plunger (the first plunger 21 and the second plunger 22) represents movement of the plungers in a direction in which the solvent in the pressurizing chamber (the first pressurizing chamber 11 and the second pressurizing chamber 12) is compressed or discharged (rightward movement in FIG. 1). On the other hand, "lowering" of the plungers indicates movement of the plunger in a direction in which the solvent is suctioned into the pressurizing chamber (leftward movement in FIG. 1). The "upper limit point" indicates a highest position within a range where the plunger can move inside the pressurizing chamber. The "lower limit point" indicates a lowest position within a range where the plunger can move inside the pressurizing chamber.

The reciprocating movement of the first plunger 21 is controlled by a first electric motor 211, a speed reducer 221, and a linear motion device 231. More specifically, the first plunger 21 is controlled by the controller 10 as follows. The motor driver 210 applies drive power to the first electric motor 211 based on a command value of the controller 10, and rotates the first electric motor 211. The rotation of the first electric motor 211 is decelerated by the speed reducer 221 and converted into a linear motion by the linear motion device 231. The first plunger 21 reciprocates according to this linear motion of the linear motion device 231.

Similarly, the reciprocating movement of the second plunger 22 is controlled by a second electric motor 212, a speed reducer 222, and a linear motion device 232. More specifically, the second plunger 22 is controlled by the controller 10 as follows. The motor driver 210 applies drive power to the second electric motor 212 based on a command value of the controller 10, and rotates the second electric motor 212. The rotation of the second electric motor 212 is decelerated by the speed reducer 222 and converted into a linear motion by the linear motion device 232. The second plunger 22 reciprocates according to this linear motion of the linear motion device 232.

The speed reducer 221 and the linear motion device 231 can be referred to as a power transmission mechanism device in a broad sense, since a combination of these components amplifies and converts the rotational power of the first electric motor 211 into the linear motion power. The same applies to the speed reducer 222 and the linear motion device 232.

Specific examples of the speed reducers 221 and 222 include a spur gear, a pulley, a planetary gear, and a worm gear. The main reason for providing the speed reducers 221 and 222 is to increase torque of the first and second electric motors 211 and 212. If the first and second electric motors 211 and 212 have an ability to generate sufficient torque, it is not necessarily required to provide the speed reducers 221 and 222.

Specific examples of the linear motion devices 231 and 232 include a ball screw, a cam, and a rack-and-pinion.

The purge valve driver 310 provides drive power to the purge valve 311 based on a command value of the controller 10. The purge valve 311 is connected on the downstream side of the second plunger pump 102. The purge valve 311 switches a direction in which the solvent discharged from the second plunger pump 102 flows between a side of the injector 2 and a side of the waste liquid tank 312.

The electromagnetic valve driver 410 applies drive power to the first electromagnetic valve 81 and the second electromagnetic valve 82 based on a command value of the controller 10. A solvent container for storing a first solvent 511 and a solvent container for storing a second solvent 512 are disposed outside the liquid delivery pump 1. The first solvent 511 and the second solvent 512 are delivered to the liquid delivery pump 1 by opening and closing of the first electromagnetic valve 81 and the second electromagnetic valve 82 as well as driving of the first plunger pump 101 and the second plunger pump 102 (the first plunger 21 and the second plunger 22).

When the first plunger pump 101 suctions the solvent, one of the first electromagnetic valve 81 and the second electromagnetic valve 82 is opened and the other is closed, and one of the first solvent 511 and the second solvent 512 is suctioned. The suctioned solvent passes through a junction portion 90, the first check valve 51, and the first suction passage 31 and flows into the first pressurizing chamber 11. The solvent suctioned and flowing into the first pressurizing chamber 11 is compressed in association with the rising of the first plunger 21.

When a pressure inside the first pressurizing chamber 11 becomes larger than a pressure inside the second pressurizing chamber 12 as a result of the compression of the solvent, the solvent passes through the first discharge passage 41, the second check valve 52, the connection flow path 103, and the second suction passage 32, flows into the second pressurizing chamber 12, and is discharged from the second discharge passage 42.

A sample to be analyzed is injected into the solvent discharged from the liquid delivery pump 1 by the injector 2. The solvent into which the sample is injected is introduced into the separation column 3 and separated for each component, and then absorbance, fluorescence intensity, refractive index, and the like according to the sample component are detected by the detector 4. The separation column 3 is filled with microparticles, and a load pressure of several tens of megapascals to more than one hundred megapascals is generated in the liquid delivery pump 1 due to a fluid resistance when the solvent flows through gaps between the microparticles. A magnitude of the load pressure varies depending on a diameter and a length of the separation column 3, a type and a size of the microparticles, a passage flow rate, and the like.

The liquid delivery pump 1 can include a flowmeter 8 on the upstream side or the downstream side of the detector 4.

In FIG. 1, as an example, the flowmeter 8 is disposed on the upstream side of the detector 4. The flowmeter 8 measures the flow rate of the solvent discharged from the liquid delivery pump 1 at the detector 4. The value measured by the flowmeter 8 is input to the controller 10. Note that the liquid delivery pump 1 may not include the flowmeter 8.

<Liquid Delivery Method>

An outline of a liquid delivery method when a solvent is delivered by normal delivery using the liquid delivery pump 1 according to the present embodiment will be described. The "normal delivery" is a liquid delivery method in a case in which a solvent discharged from the liquid delivery pump 1 is caused to flow to the injector 2, the separation column 3, and the detector 4 to analyze a sample. Note that an operation of the liquid delivery method in a case in which the sample is not analyzed (in a case in which the solvent is delivered to the waste liquid tank 312) is similar to that in the case in which the sample is analyzed, and thus the description thereof will be omitted.

Figure 2:
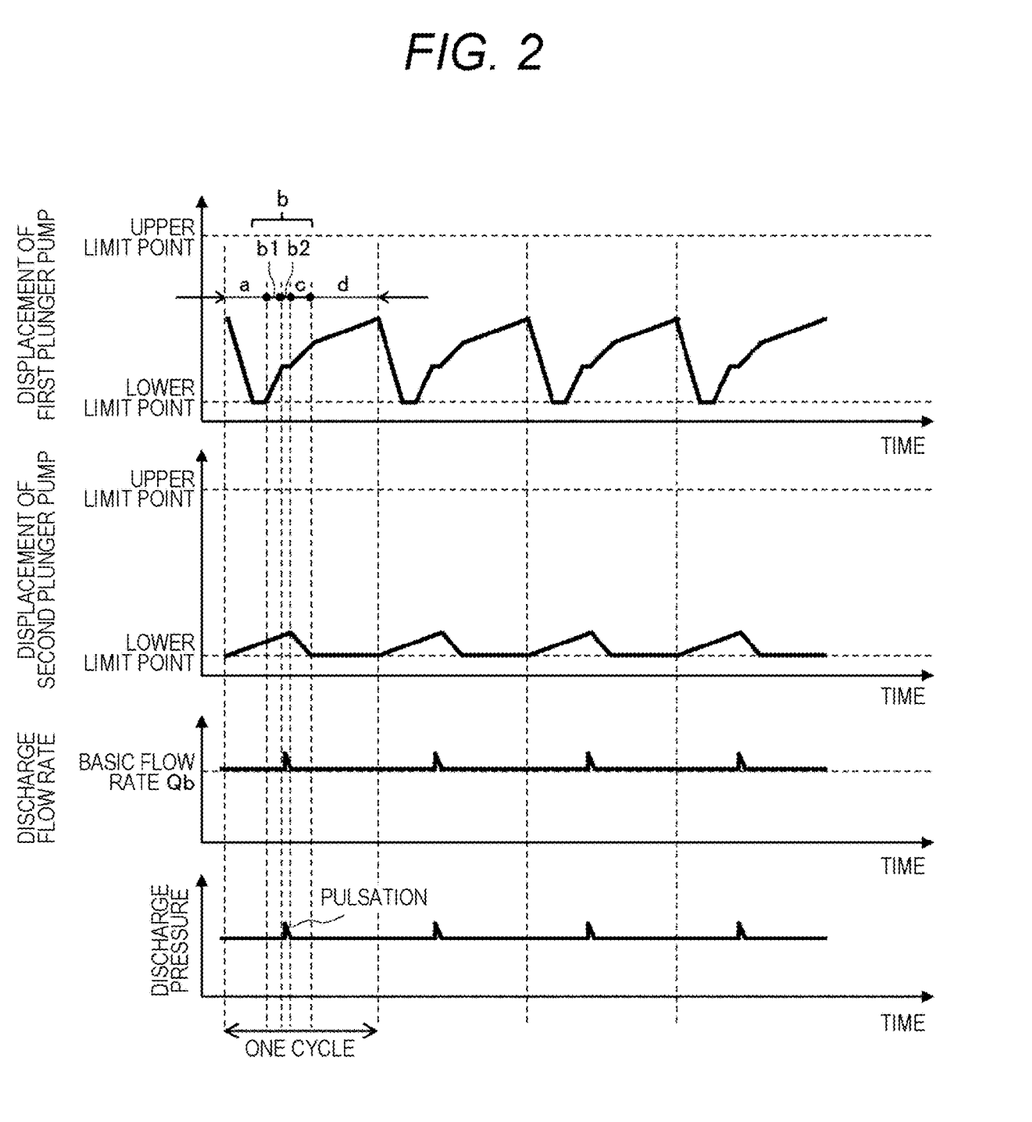
FIG. 2 is a graph showing displacements of a first plunger and a second plunger, and a discharge flow rate and a discharge pressure of a solvent when the solvent is delivered by normal delivery.

FIG. 2 is a graph showing displacements of the first plunger 21 and the second plunger 22, and a discharge flow rate and a discharge pressure of the solvent when the solvent is delivered by normal delivery by the liquid delivery pump 1. In four graphs shown in FIG. 2, the horizontal axis represents time, and the vertical axis represents, in order from the top, the displacement of the first plunger 21, the displacement of the second plunger 22, the discharge flow rate of the solvent, and the discharge pressure of the solvent. Here, the discharge flow rate is a flow rate of the solvent discharged by the liquid delivery pump 1 (a flow rate of the solvent immediately after the liquid delivery pump 1 discharges the solvent), and the discharge pressure is a pressure detected by the pressure sensor 110, that is, a pressure of the solvent discharged from the liquid delivery pump 1. For the displacement of the first plunger 21 and the displacement of the second plunger 22, the upward direction (right direction in FIG. 1) is a positive direction and the downward direction (left direction in FIG. 1) is a negative direction. For the discharge flow rate, discharge is positive and suction is negative.

In the normal delivery, both the first plunger 21 and the second plunger 22 operate with the lower limit point as a reference.

In the normal delivery, both the first plunger pump 101 and the second plunger pump 102 operate cyclically. FIG. 2 illustrates an operation of four cycles. In one cycle of liquid delivery, there are four sections of a section a, a section b, a section c, and a section d in time order.

The section a is a section in which the first plunger 21 descends and suctions the solvent. The section b is a section in which the first plunger 21 rises and compresses the solvent. In the section a and the section b, since the solvent is not discharged from the first pressurizing chamber 11, the second plunger 22 rises and discharges the solvent. Although details will be described later, the section b includes a section b1 in which the first plunger 21 rises and a following section b2 in which the first plunger 21 stops. The section c is a section in which the second plunger 22 descends and suctions the solvent. In the section c, the first plunger 21 rises and discharges the solvent by an amount suctioned by the second plunger 22 and an amount discharged by the liquid delivery pump 1. In the section d, the first plunger 21 rises and discharges the solvent, and the second plunger 22 stops.

By performing such an operation, the first plunger pump 101 and the second plunger pump 102 can maintain the discharge flow substantially constant, and the discharge pressure e from the liquid delivery pump 1 substantially constant.

The first plunger 21 operates differently between the section b1 and the section b2. The timing at which the first plunger 21 switches these operations can be, for example, a timing at which the pressure sensor 110 detects pulsation of the discharge pressure. Specifically, in the section b1, when the first plunger 21 rises and continues the compression operation, the pressure of the solvent inside the first pressurizing chamber 11 exceeding the discharge pressure causes the discharge flow rate to instantaneously increase, and accordingly the discharge pressure also instantaneously increases. FIG. 2 illustrates the pulsation of the discharge flow rate and the discharge pressure generated in this manner. The controller 10 switches the operation of the first plunger 21 from the operation in the section b1 to the operation in the section b2 at the timing when the pressure sensor 110 detects the pulsation of the discharge pressure.

Hereinafter, a volume flow rate of the solvent in a compressed state (high pressure state) discharged from the liquid delivery pump 1 when there is no leakage is referred to as "basic flow rate Qb". In the sections a and b and in the sections c and d, the basic flow rate Qb is expressed by the following expressions (1) and (2), respectively.

$$Qb = v2 \times A (\text{sections } a, b) \quad (1)$$

$$Qb = (v1 + v2) \times A (\text{sections } c, d) \quad (2)$$

Here, v1 is a moving speed of the first plunger 21, v2 is a moving speed of the second plunger 22, and A is a cross-sectional area of the first plunger 21 and the second plunger 22 which is a known value. However, it is assumed that the first plunger 21 and the second plunger 22 have the same cross-sectional area.

The basic flow rate Qb in the sections a and b substantially matches a value obtained by dividing the volume of the solvent pushed away by the rising of the second plunger 22 by the time of the corresponding section, and in the sections c and d substantially matches a value obtained by dividing a difference between the volume of the solvent pushed away by the rising of the first plunger 21 and the volume of the solvent pulled in by the lowering of the second plunger 22 by the time of the corresponding section. That is, the basic flow rate Qb is a volume flow rate of the solvent in a compressed state discharged from the liquid delivery pump 1 when there is no leakage (however, pulsation is not considered). The discharge flow rate shown in FIG. 2 is a volume flow rate when there is no leakage, that is, the basic flow rate Qb, and the pulsation is shown as well.

When the basic flow rate Qb is known, the cross-sectional area A is also known, and v1 and v2 in the sections a and b and the sections c and d, that is, the speed at which the first plunger 21 and the second plunger 22 are moved are obtained from the expressions (1) and (2). However, a ratio between v1 and v2 needs to be determined in advance. Specifically, in the sections a and b, v2 is obtained from the expression (1). At this time, the operation of the first plunger 21 does not affect the discharge flow rate, and therefore the speed at which the solvent is suctioned in the section a and the speed at which the solvent is compressed in the section b can take arbitrary values respectively within the ranges of the time of the sections a and b. In the section d, v2=0 from the displacement of the second plunger 22 in FIG. 2, and thus v1 is obtained from the expression (2). In the section c, v2 is obtained so that the second plunger 22 returns to the lower limit point at the time of the section c, and v1 is obtained from the expression (2).

<Another Configuration Example of Liquid Chromatograph>

Figure 3:
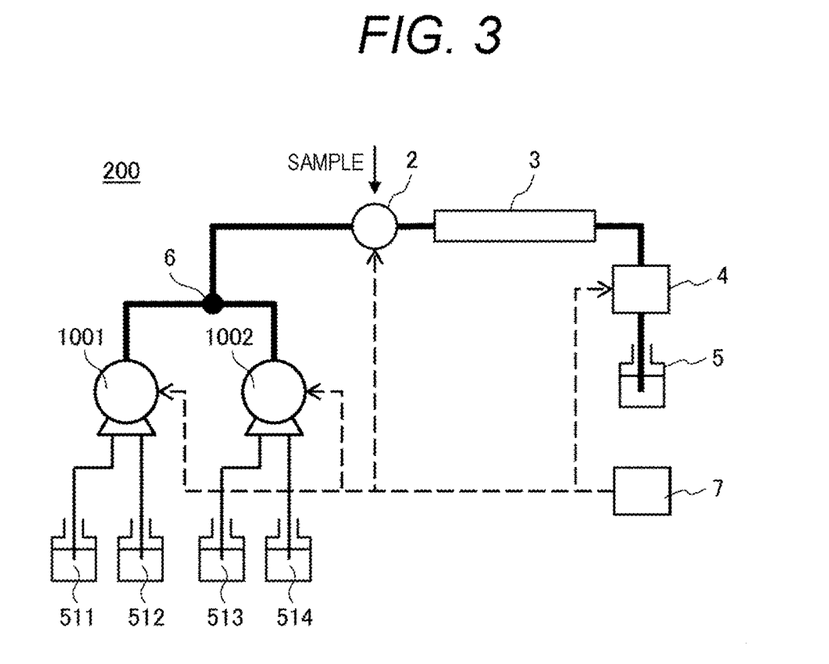
FIG. 3 is a schematic diagram illustrating a configuration of a liquid chromatograph including two liquid delivery pumps.

FIG. 3 is a schematic diagram illustrating a configuration of a liquid chromatograph 200 including two liquid delivery pumps 1001 and 1002. The liquid chromatograph 200 illustrated in FIG. 3 includes the liquid delivery pump 1001, the liquid delivery pump 1002, the injector 2, the separation column 3, the detector 4, the waste liquid container 5, and the system control unit 7. The liquid delivery pump 1001 and the liquid delivery pump 1002 have the same configuration as the liquid delivery pump 1 (FIG. 1) according to the present embodiment.

The liquid chromatograph 200 illustrated in FIG. 3 includes the two liquid delivery pumps 1001 and 1002 connected in parallel, and has a configuration capable of performing so-called high-pressure gradient analysis. The liquid delivery pumps 1001 and 1002 deliver different solvents, respectively. That is, the liquid delivery pump 1001 delivers the first solvent 511 and the second solvent 512, and the liquid delivery pump 1002 delivers a third solvent 513 and a fourth solvent 514. A channel from the liquid delivery pump 1001 and a channel from the liquid delivery pump 1002 merge at a junction point 6 on the upstream side of the injector 2.

The solvent delivered from the liquid delivery pump 1001 and the solvent delivered from the liquid delivery pump 1002 are mixed on the downstream side of the junction point 6 and delivered to the separation column 3. The flow rates of the liquid delivery pumps 1001 and 1002 are appropriately set by the system control unit 7 according to the analysis items.

In the high-pressure gradient analysis, generally, a total flow rate of the liquid delivery pump 1001 and the liquid delivery pump 1002 is set to be constant, and a concentration of the solvent flowing through the separation column 3 is changed by changing the flow rate of each of the liquid delivery pumps 1001 and 1002. Therefore, the flow rates of the liquid delivery pumps 1001 and 1002 sequentially change in one analysis. Thus, it is necessary to correct a pump operation (driving speed of the plunger) according to the target flow rate (a target flow rate at the detector 4).

<Factors Affecting Flow Rate Accuracy>

Figure 4:
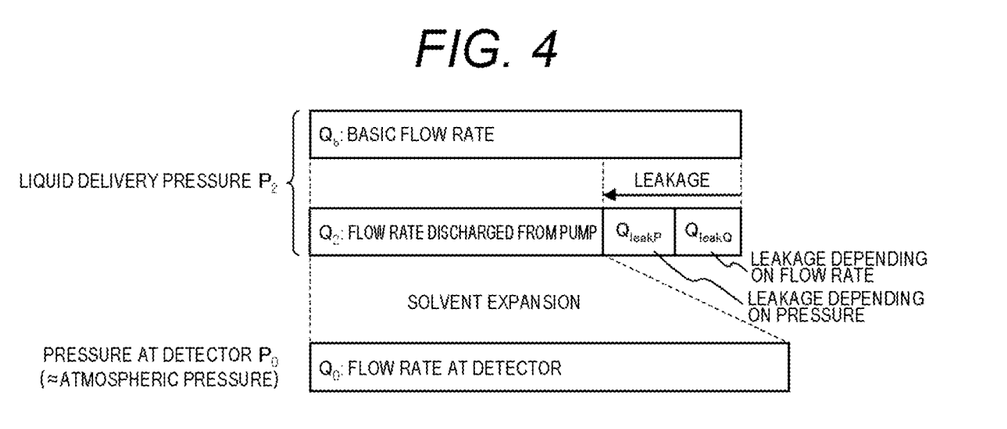
FIG. 4 is a diagram schematically illustrating a relationship of factors that affect flow rate accuracy of a liquid delivery pump.

FIG. 4 is a diagram schematically illustrating a relationship of factors that affect the flow rate accuracy of the liquid delivery pump 1. In FIG. 4, the flow rate is indicated by a rectangle that is long in a right and left direction of the paper surface. The length of each rectangle in the right and left direction indicates the magnitude of the flow rate (volume flow rate). The liquid delivery pressure (discharge pressure) of the solvent is represented by P2, and the pressure of the solvent at the detector 4 is represented by P0. The liquid delivery pressure P2 is a pressure of the solvent inside the liquid delivery pump 1 and is a pressure measured by the pressure sensor 110. The pressure P0 of the solvent at the detector 4 is substantially equal to the atmospheric pressure and is lower than the liquid delivery pressure P2.

The flow rate of the solvent varies due to solvent leakage and expansion. Hereinafter, a change in the flow rate due to solvent leakage and a change in the flow rate due to solvent expansion will be described.

The solvent is compressed when the pressure is the liquid delivery pressure (discharge pressure) P2. The first plunger 21 and the second plunger 22 push off the solvent in this state at the basic flow rate Qb. Without solvent leakage, the solvent at the basic flow rate Qb is discharged from the liquid delivery pump 1. In practice, the solvent leaks from the gaps between the plungers 21 and 22 and the seals 61 and 62, through connection portions of the check valves 51 and 52, and the like, and thus the flow rate discharged from the liquid delivery pump 1 is smaller than the basic flow rate Qb by an amount of the leakage.

The solvent leakage includes pressure dependent leakage and flow rate dependent leakage. An amount of the pressure dependent leakage is represented by QleakP and an amount of the flow rate dependent leakage is represented by QleakQ.

As illustrated in FIG. 4, the flow rate of the solvent whose pressure is the liquid delivery pressure P2 is the basic flow rate Qb, when there is no leakage. If there is the pressure dependent leakage and the flow rate dependent leakage, the flow rate will be reduced by a sum of QleakP and QleakQ. That is, when there is leakage, the flow rate Q2 of the solvent discharged from the liquid delivery pump 1 (the pressure is P2) is smaller than the basic flow rate Qb by (QleakP+QleakQ) without considering solvent expansion.

The pressure dependent leakage is a phenomenon in which the solvent leaks from a location where the leakage occurs due to a pressure difference between the pressure of the solvent inside the liquid delivery pump 1 and the pressure outside the liquid delivery pump 1 (atmospheric pressure). The pressure dependent leakage increases, as the pressure difference becomes larger.

The flow rate dependent leakage is, for example, a phenomenon in which the solvent adheres to the plungers 21 and 22 when the plungers 21 and 22 descend, and the solvent leaks from the gap between the seals 61 and 61 and the plungers 21 and 22. The flow rate dependent leakage occurs, for example, when the second plunger 22 descends in the section c illustrated in FIG. 2. When the flow rate is large, the descending distance of the second plunger 22 in the section c is large, and thus a large amount of solvent leaks. It is considered that there are several other mechanisms of the pressure dependent leakage mechanisms and the flow rate dependent leakage.

As shown in FIG. 4, at the detector 4, the flow rate changes as the solvent expands. The pressure of the solvent at the detector 4 is P0, which is substantially equal to the atmospheric pressure, and is lower than the liquid delivery pressure P2. Therefore, the solvent at the detector 4 is expanded more than the solvent in the liquid delivery pump 1. Due to this expansion, the flow rate Q0 of the solvent at the detector 4 is larger than Q2 (the flow rate of the solvent discharged from the liquid delivery pump 1 at the liquid delivery pressure P2).

The liquid delivery pump 1 according to the present embodiment can deliver a liquid with high flow rate accuracy by correcting a change in the flow rate of the solvent due influences of the pressure dependent leakage of the solvent, the flow rate dependent leakage of the solvent, and the solvent expansion in consideration thereof.

Figure 5:
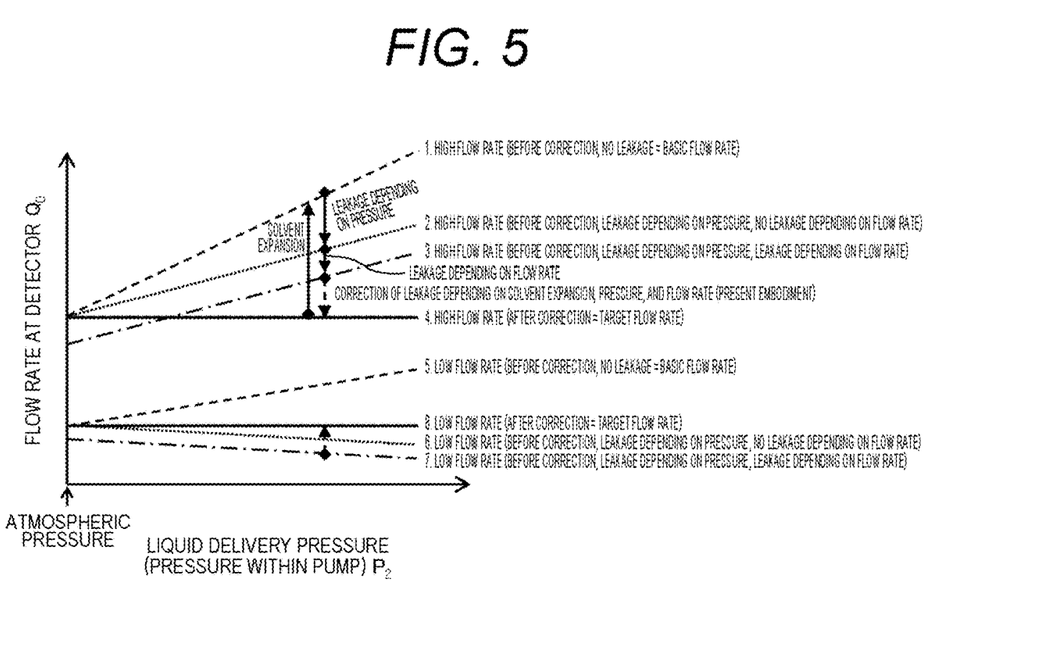
FIG. 5 is a diagram schematically illustrating a flow rate of the solvent by a detector with respect to a liquid delivery pressure.

FIG. 5 is a diagram schematically showing the flow rate Q0 of the solvent at the detector 4 with respect to the liquid delivery pressure P2, and schematically shows how the correction of the flow rate of the solvent changes the flow rate Q0 of the solvent at the detector 4. In the graph of FIG. 5, lines 1-4 indicate a case where the flow rate of the solvent is large (in the case of a high flow rate), and lines 5-8 indicate a case where the flow rate of the solvent is smaller than that in the case of a high flow rate (in the case of a low flow rate). As described above, the liquid delivery pressure P2 is a pressure of the solvent inside the liquid delivery pump 1 and is a pressure measured by the pressure sensor 110.

The dashed line 1 indicates the flow rate Q0 at the detector 4 when the flow rate of the solvent discharged from the liquid delivery pump 1 is the basic flow rate Qb, that is, the flow rate Q0 at the detector 4 without leakage and before the flow rate is corrected (correction of the change in the flow rate due to the solvent expansion). The larger the pressure, the more the solvent is compressed and the more it expands at the detector 4 (the pressure at the detector 4 is P0 is approximately equal to the atmospheric pressure). Therefore, the flow rate Q0 of the solvent at the detector 4 increases as the liquid delivery pressure P2 increases. When the liquid delivery pressure P2 is equal to the atmospheric pressure, there is no compression and expansion of the solvent, and the flow rate Q0 at the detector 4 is the basic flow rate Qb.

The dotted line 2 shows the flow rate Q0 at the detector 4 before the correction of the flow rate is performed when there is pressure dependent leakage and no flow rate dependent leakage in the solvent. The flow rate indicated by the dotted line 2 is smaller than the flow rate indicated by the dashed line 1 by the pressure dependent leakage. However, since no pressure dependent leakage occurs when the liquid delivery pressure P2 is equal to the atmospheric pressure, the flow rate Q0 at the detector 4 is the basic flow rate Qb when the liquid delivery pressure P2 is equal to the atmospheric pressure.

The alternate long and short dash line 3 shows the flow rate Q0 at the detector 4 before the correction of the flow rate is performed when there are both pressure dependent leakage and flow rate dependent leakage in the solvent. The flow rate indicated by the alternate long and short dash line 3 is smaller than the flow rate indicated by the dotted line 2 by the flow rate dependent leakage. The flow rate dependent leakage does not depend on the pressure, and occurs even when the liquid delivery pressure P2 is equal to the atmospheric pressure. Therefore, the flow rate Q0 at the detector 4 when the liquid delivery pressure P2 is equal to the atmospheric pressure does not match the basic flow rate Qb.

The solid line 4 indicates a target flow rate which is the flow rate Q0 as a target at the detector 4. The target flow rate indicated by the solid line 4 is a flow rate when a change in the flow rate due to the solvent expansion, the pressure dependent leakage of the solvent, and the flow rate dependent leakage of the solvent is corrected with respect to the flow rate indicated by the alternate long and short dash line 3. The value of the target flow rate can be set in advance.

The flow rates indicated by the dashed line 5, the dotted line 6, the alternate long and short dash line 7, and the solid line 8 are smaller than the flow rate indicated by the lines 1-4, but exhibit flow rate characteristics similar to those of the dashed line 1, the dotted line 2, the alternate long and short dash line 3, and the solid line 4, respectively.

In the liquid delivery pump 1 according to the present embodiment, the controller 10 drives the first plunger 21 and the second plunger 22 so that the flow rate Q0 at the detector 4 becomes constant at the target flow rate with respect to the liquid delivery pressure P2, that is, the flow rate Q0 exhibits the flow rate characteristics indicated by the solid line 4 and the solid line 8 in FIG. 5. The flow rate characteristics indicated by the solid line 4 and the solid line 8 are obtained by changing the basic flow rate Qb for each liquid delivery pressure P2 (that is, correcting a change in the flow rate due to solvent expansion and leakage).

<Expression for Leakage Correction>

The flow rate characteristic indicated by the alternate long and short dash line 3 in FIG. 5 is approximated by an expression (3).

$$Q0 = \exp(f(P2)) \times (Qb - Cleakp \times P2 - Cleakq \times Qb) + Qoffset \quad (3)$$

In the expression (3), 00 is the flow rate at the detector 4, P2 is the liquid delivery pressure, f(P2) is a function of an expansion coefficient with respect to the liquid delivery pressure P2 (a ratio of a volume of the solvent at atmospheric pressure to a volume of the solvent at the liquid delivery pressure P2), Qb is the basic flow rate, Cleakp is a proportional coefficient for the pressure dependent leakage, Cleakq is a proportional coefficient for the flow rate dependent leakage, and Qoffset is an adjustment coefficient of an approximate expression.

The liquid delivery pressure P2 is measured by the pressure sensor 110. As the value given by the function f(P2), a known value such as a value described in a literature may be used, or a value obtained by actual measurement may be used. Here, Qoffset is a parameter for fitting the measured value of the flow rate to the expression (3) by adjusting an influence of the pulsation or the like, the measurement error of the flow rate, or the like, which are not included in the idea described with reference to FIGS. 4 and 5.

The expression (3) is modified as follows.

$$Qb = C1 \times Q0 + C0 \quad (4)$$

However, the parameters C1 and C0 are expressed as follows.

$$C1 = 1/((1 - Cleakq) \times \exp(f(P2))) \quad (5)$$

$$C0 = (1/(1 - Cleakq)) \times (Cleakp \times P2 - Qoffset/\exp(f(P2))) \quad (6)$$

In addition, assuming that C1 and C0 are parameters that change linearly with respect to the liquid delivery pressure P2 (parameters expressed by linear functions of the liquid delivery pressure P2), the parameters C1 and C0 are expressed as follows.

$$C1 = C1a \times P2 + C1b \quad (7)$$

$$C0 = C0a \times P2 - C0b \quad (8)$$

In the liquid delivery pump 1 according to the present embodiment, the controller 10 obtains the basic flow rate Qb with respect to the target flow rate (00) at the detector 4 from the expression (4) using the parameters C1 and C0 and the flow rate Q0 as a target at the detector 4 (that is, the target flow rate), obtains a moving speed v1 of the first plunger 21 and a moving speed v2 of the second plunger 22 from the expressions (1) and (2) using the basic flow rate Qb, and drives the first plunger 21 and the second plunger 22 at the obtained moving speed v1 and the obtained moving speed v2, respectively. The parameters C1 and C0 depend on the liquid delivery pressure P2, and can be obtained using the liquid delivery pressure P2.

In the liquid delivery pump 1 according to the present embodiment, the flow rate characteristics (flow rate characteristic in which flow rate Q0 at the detector 4 is constant at the target flow rate with respect to the liquid delivery pressure P2) indicated by the solid line 4 and the solid line 8 in FIG. 5 are obtained by changing the parameters C1 and C0, that is, the basic flow rate Qb obtained from the expression (4) for each liquid delivery pressure P2. The liquid delivery pump 1 according to the present embodiment can deliver a liquid with high flow rate accuracy by driving the first plunger 21 and the second plunger 22 and correcting the flow rate as described above.

The parameters C1 and C0 are parameters used for correcting the flow rate (correction parameters), and are parameters of an expression (expression (4) obtained by modifying the expression (3)) representing a relationship between the liquid delivery pressure P2 and the flow rate Q0 of the solvent at the detector 4. The correction parameters C1 and C0 are set according to the expressions (5) and (6) or according to the expressions (7) and (8). That is, there are two ways of obtaining the correction parameters C1 and C0. The controller 10 stores the coefficients Cleakp, Cleakq, Qoffset, and the function f(P2) in a case where the correction parameters C1 and C0 are obtained from the expressions (5) and (6), and stores the coefficients C1a, C1b, C0a, and C0b in a case where the correction parameters C1 and C0 are obtained from the expressions (7) and (8).

Values of the parameters in the expressions (5) to (8) vary depending on physical properties of the solvent (for example, viscosity, compression rate, and the like. The controller 10 can store the values of the parameters of the expressions (5) to (8) for each solvent (for example, as a table) and change the values of the parameters C1 and C0 according to the solvent. Alternatively, the controller 10 can store the values of the coefficients representing the parameters C1 and C0 as a function of the physical properties of the solvent, obtain the values of the parameters C1 and C0 for each solvent, and change the values of the parameters C1 and C0 according to the solvent.

How to obtain Cleakp, Cleakq, and Qoffset in the expression (3) will be described later.

<Pressure Feedback>

As shown by the expressions (5) and (6) (or the expressions (7) and (8)), the correction parameters C1 and C0 depend on the liquid delivery pressure P2. The liquid delivery pressure P2 changes depending on the state of the separation column 3 and piping, changes in the viscosity of the solvent depending on the temperature, and the like. Therefore, it is desirable to adjust the parameters C1 and C0 according to the liquid delivery pressure P2 and to drive the liquid delivery pump 1 based on the adjusted parameters C1 and C0. Thus, it is desirable that the value measured by the pressure sensor 110 is fed back to the controller 10, and that the controller 10 recalculates (adjusts) the parameters C1 and C0.

As feedback of the liquid delivery pressure P2, the controller 10 receives a measured value (liquid delivery pressure P2) from the pressure sensor 110 in real time (at a control cycle of the controller 10 in practice) while the liquid delivery pump 1 is discharging the solvent. While the liquid delivery pump 1 is discharging the solvent, the controller 10 calculates and obtains the parameters C1 and C0 based on the expressions (5) and (6) (or the expressions (7) and (8)) using the liquid delivery pressure P2 obtained by the feedback, calculates the basic flow rate Qb with respect to the target flow rate (Q0) from the expression (4) using the obtained parameters C1 and C0, and obtains the moving speeds v1 and v2 of the first plunger 21 and the second plunger 22 using the basic flow rate Qb, thereby driving the first plunger 21 and the second plunger 22. In this manner, the liquid delivery pump 1 according to the present embodiment can adjust the flow rate Q0 at the detector 4 to be constant at the target flow rate even when the liquid delivery pressure P2 changes.

The feedback of the liquid delivery pressure P2 can be performed at an arbitrary timing, and for example, can be performed in real time or every drive cycle of the liquid delivery pump 1. When the feedback is performed for every drive cycle of the liquid delivery pump 1, a time interval for calculation of the parameters C1 and C0 increases, and the flow rate can be easily corrected even if a calculation capability of the controller 10 is low. Therefore, it is not necessary to use the expensive controller 10, and the device cost can be reduced.

<How to Determine Correction Parameter>

The correction parameters C1 and C0 expressed by the expressions (5) and (6) can be determined for each solvent by measuring the flow rate Q0 of the solvent at the detector 4 with respect to the liquid delivery pressure P2 for a plurality of basic flow rates Qb. The flow rate Q0 of the solvent at the detector 4 can be measured by the flowmeter 8. As the number of basic flow rates Qb that are measured increases, the correction parameters C1 and C0 can be obtained more accurately.

Figure 6A:
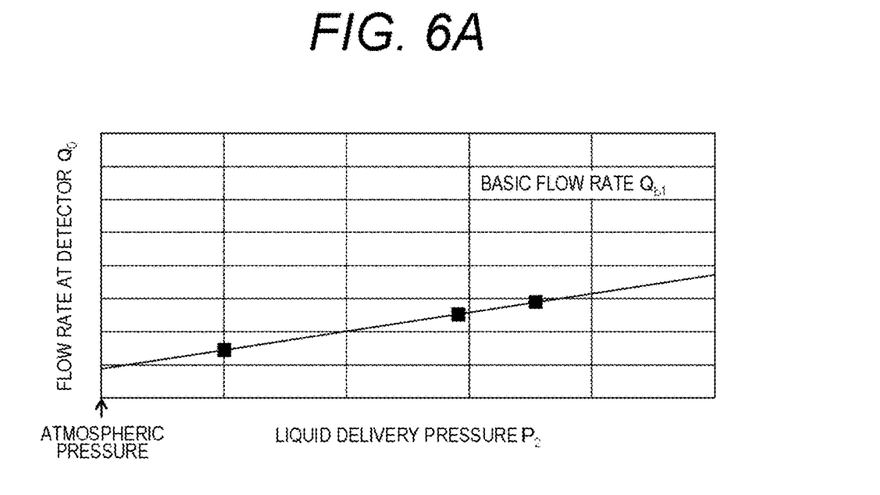
FIG. 6A is a diagram schematically illustrating an example of a measurement value of the flow rate of the solvent by the detector with respect to the liquid delivery pressure when a basic flow rate is Qb1.
Figure 6B:
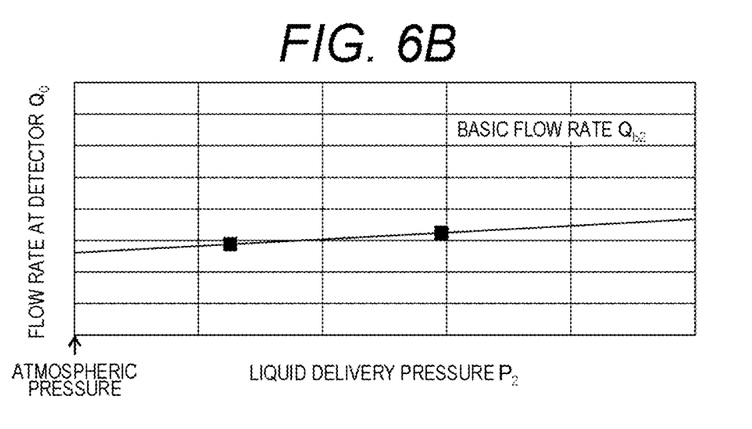
FIG. 6B is a diagram schematically illustrating an example of the measurement value of the flow rate of the solvent by the detector with respect to the liquid delivery pressure when the basic flow rate is Qb2.

FIGS. 6A and 6B are diagrams schematically illustrating an example of a measurement value of the flow rate Q0 of the solvent at the detector 4 with respect to the liquid delivery pressure P2. In the present embodiment, as an example, a case where there are two basic flow rates Qb will be described. FIG. 6A illustrates an example in which the basic flow rate is Qb1, and FIG. 6B illustrates an example in which the basic flow rate is Qb2 (<Qb1).

As illustrated in FIGS. 6A and 6B, flow rate characteristic charts are obtained for a plurality of (two in the present embodiment) basic flow rates Qb (Qb1, Qb2) by plotting measurement values taking the horizontal axis as the liquid delivery pressure P2 and the vertical axis as the flow rate Q0 at the detector 4. Then, values of Cleakq, Cleakp, and Qoffset can be obtained by fitting the flow rate characteristic charts (FIGS. 6A and 6B) to the expression (3) using a known value obtained from literature or the like as the value of the function f(P2) of the expansion coefficient. The values of Cleakq, Cleakp, and Qoffset are obtained, for example, by fitting the measured values of the flow rate Q0 with respect to the basic flow rate Qb and the liquid delivery pressure P2 in the flow rate characteristic charts to the expression (3) using a numerical optimization method. Then, the parameters C1 and C0 can be obtained by substituting these obtained values into the expressions (5) and (6).

As described above, the controller 10 can obtain the parameters C1 and C0 based on the relationship between the liquid delivery pressure P2 measured by the pressure sensor 110 and the flow rate Q0 of the solvent at the detector 4 measured by the flowmeter 8.

The controller 10 can also obtain the correction parameters C1 and C0 from the expressions (7) and (8) as follows.

Figure 7A:
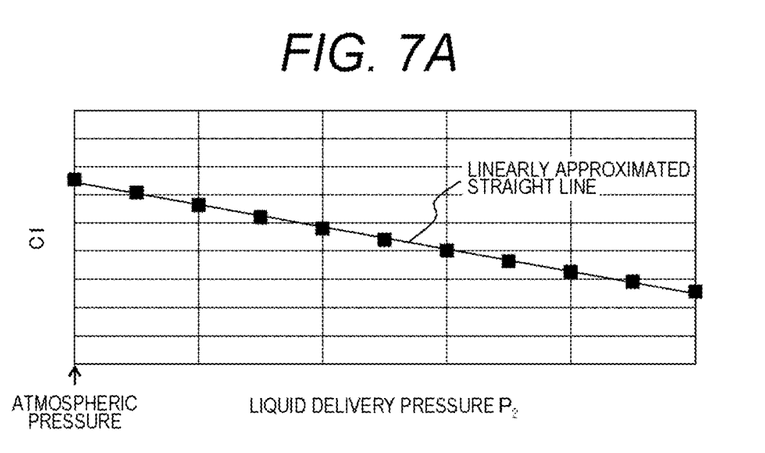
FIG. 7A is a diagram schematically illustrating an example of plotting a parameter C1 obtained from an expression (5) with respect to the liquid delivery pressure.
Figure 7B:
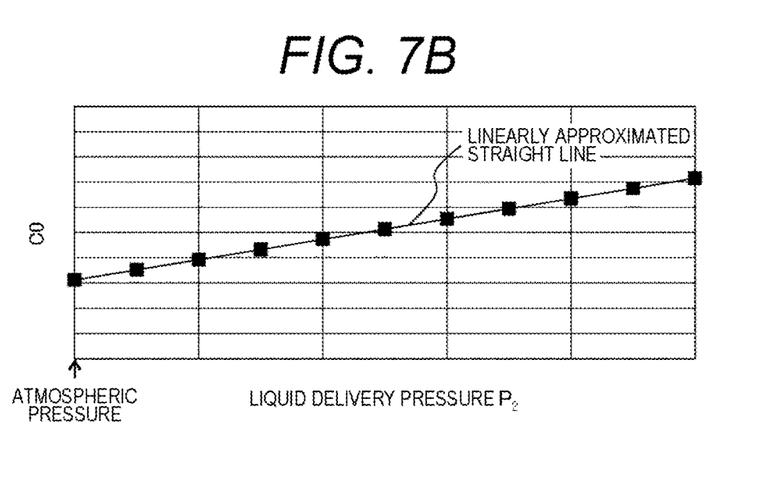
FIG. 7B is a diagram schematically illustrating an example of plotting a parameter C0 obtained from an expression (6) with respect to the liquid delivery pressure.

FIG. 7A is a diagram schematically illustrating an example of plotting the parameter C1 obtained from the expression (5) with respect to the liquid delivery pressure P2. FIG. 7B is a diagram schematically illustrating an example of plotting the parameter C0 obtained from the expression (6) with respect to the liquid delivery pressure P2. The values of Cleakq, Cleakp, and Qoffset were obtained by the above method.

The parameters C1a and C1b representing the parameter C1 of the expression (7) can be obtained by obtaining a straight line obtained by linearly approximating the plot line illustrated in FIG. 7A. In addition, the parameters C0a and C0b representing the parameter C0 of the expression (8) can be obtained by obtaining a straight line obtained by linearly approximating the plot line illustrated in FIG. 7B.

The timing at which the flow rate Q0 of the solvent at the detector 4 is measured by the flowmeter 8 to set or update the correction parameters C1 and C0 can be arbitrarily set, and can be immediately after the liquid delivery pump 1 is assembled (initial state), immediately after the liquid delivery pump 1 is installed at a use location, and at the time of periodic maintenance of the liquid delivery pump 1 at the use location, for example. When the liquid delivery pump 1 does not include the flowmeter 8, a user installs the flowmeter 8 and measures the flow rate Q0 of the solvent.

In a case where the liquid delivery pump 1 includes the flowmeter 8, the controller 10 can update the correction parameters C1 and C0 at any time during the operation of the liquid delivery pump 1.

The system control unit 7 can record values measured by the flowmeter 8 automatically or by an input by the user. The system control unit 7 can also calculate each parameter by the above-described calculation and input the parameter to the controller 10.

The user can also input values of the parameters to the system control unit 7.

When the system of the liquid chromatograph 100 is connected to a network environment such as the Internet, the user or a device manufacturer can input the measured value of the flowmeter 8 or the value of each parameter to the system control unit 7 via the network.

As described above, the liquid delivery pump 1 according to the present embodiment can correct the basic e in flow rate Qb according to the target flow rate consideration of the solvent expansion, the pressure dependent leakage of the solvent, and the flow rate dependent leakage of the solvent, and can perform liquid delivery with high flow rate accuracy.

It should be noted that the present invention is not limited to the above embodiments, and various modifications can be made. For example, the above-described embodiment has been described in detail in order to describe the present invention in an easy-to-understand manner, and is not necessarily intended to limit to those having all of the described configurations. Further, a part of the configuration of one embodiment can be replaced with the configuration of another embodiment. In addition, the configuration of one embodiment can be added to the configuration of another embodiment. In addition, it is possible to delete a part of the configuration of the embodiment, to add another configuration, or to replace a part of the configuration of the embodiment with another configuration.

REFERENCE SIGNS LIST

1 liquid delivery pump
2 injector
3 separation column
4 detector
5 waste liquid container
6 junction point
7 system control unit
8 flowmeter
10 controller
11 first pressurizing chamber
12 second pressurizing chamber
21 first plunger
22 second plunger
31 first suction passage
32 second suction passage
41 first discharge passage
42 second discharge passage
51 first check valve
52 second check valve
61 first seal
62 second seal
71, 72 bearing
81 first electromagnetic valve
82 second electromagnetic valve
90 junction portion
100 liquid chromatograph
101 first plunger pump
102 second plunger pump
103 connection flow path
110 pressure sensor
111 first pump head
112 second pump head
200 liquid chromatograph
210 motor driver
211 first electric motor
212 second electric motor
221 speed reducer
222 speed reducer
231 linear motion device
232 linear motion device
310 purge valve driver
311 purge valve
312 waste liquid tank
410 electromagnetic valve driver
511 first solvent
512 second solvent
513 third solvent
514 fourth solvent
1001, 1002 liquid delivery pump

The invention claimed is:

1. A liquid delivery pump that discharges a liquid, the liquid delivery pump comprising:
a first plunger pump having a movable first plunger;
a second plunger pump having a movable second plunger and connected to the first plunger pump;
a pressure sensor disposed on a downstream side of the second plunger pump, and configured to measure a liquid delivery pressure that is a pressure of the liquid discharged from the second plunger pump; and
a control unit configured to receive the liquid delivery pressure measured by the pressure sensor, and control driving of the first plunger and driving of the second plunger,
wherein the control unit obtains a moving speed of the first plunger and a moving speed of the second plunger using a set of parameters depending on the liquid delivery pressure, the liquid delivery pressure, and a target flow rate which is a predetermined flow rate of the liquid,
wherein the set of parameters are expressions representing a relationship between the liquid delivery pressure and a flow rate of the liquid, and a relationship between a basic flow rate and the flow rate of the liquid, and
wherein the basic flow rate is a flow rate of the liquid in a compressed state discharged from the liquid delivery pump when there is no leakage.

2. The liquid delivery pump according to claim 1, wherein while the liquid delivery pump is discharging the liquid, the control unit calculates and obtains the set of parameters by receiving the liquid delivery pressure from the pressure sensor, and obtains the moving speed of the first plunger and the moving speed of the second plunger by using the obtained set of parameters.

3. The liquid delivery pump according to claim 1, wherein the set of parameters linearly change with respect to the liquid delivery pressure.

4. The liquid delivery pump according to claim 1, further comprising:
- a flowmeter configured to measure the flow rate of the liquid,
- wherein the control unit obtains the set of parameters based on a relationship between the liquid delivery pressure and the flow rate measured by the flowmeter.

* * * * *